United States Patent
Radulescu et al.

(10) Patent No.: US 10,368,305 B2
(45) Date of Patent: Jul. 30, 2019

(54) AUTOMATIC NETWORK SELECTION FOR MULTEFIRE

(71) Applicant: QUALCOMM Incorporated, San Diego, CA (US)

(72) Inventors: Andrei Dragos Radulescu, San Diego, CA (US); Tao Luo, San Diego, CA (US); Chirag Patel, San Diego, CA (US); Miguel Griot, La Jolla, CA (US); Manu Sharma, San Diego, CA (US); Tamer Kadous, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/465,383

(22) Filed: Mar. 21, 2017

(65) Prior Publication Data

US 2017/0280382 A1 Sep. 28, 2017

Related U.S. Application Data

(60) Provisional application No. 62/313,703, filed on Mar. 25, 2016.

(51) Int. Cl.
*H04W 48/18* (2009.01)
*H04W 48/10* (2009.01)
(Continued)

(52) U.S. Cl.
CPC ........... *H04W 48/18* (2013.01); *H04W 48/10* (2013.01); *H04W 48/16* (2013.01); *H04W 74/0833* (2013.01)

(58) Field of Classification Search
CPC ..... H04W 36/08; H04W 48/02; H04W 48/10; H04W 48/16; H04W 48/18; H04W 48/20;
(Continued)

(56) References Cited

U.S. PATENT DOCUMENTS

2005/0213566 A1 9/2005 Jutila et al.
2008/0253332 A1* 10/2008 Ore ...................... H04J 11/0069
370/331
(Continued)

OTHER PUBLICATIONS

Hartung et al., "Policy Driven Multi-Band Spectrum Aggregation for Ultra-Broadband Wireless Networks," 2015 IEEE International Symposium on Dynamic Spectrum Access Networks (DYSPAN), Sep. 29, 2015, pp. 82-93, XP032822637, DOI: 10.1109/DYSPAN.2015.7343852, Institute of Electrical and Electronics Engineers.
(Continued)

*Primary Examiner* — Quoc Thai N Vu
(74) *Attorney, Agent, or Firm* — Holland & Hart LLP

(57) ABSTRACT

Methods, systems, and devices for wireless communication are described. A user equipment (UE) may attempt to access a network at a local area network access point without prior context information. The access point may be a hotspot operating in unlicensed spectrum according to a Long Term Evolution (LTE)-based standard. The UE may be unable to determine if it is authorized to access the network, so the UE may attempt to obtain system information that provides a list of service providers supported by the network. The UE may then determine whether it has credentials for a supported service provider, and the UE may access the network using those credentials when a supported service provider is recognized. Other broadcast messages may provide information about system information for supported service providers. A UE that is unable to access the network using stored credentials may attempt access using a random access channel procedure.

30 Claims, 13 Drawing Sheets

(51) Int. Cl.
*H04W 48/16* (2009.01)
*H04W 74/08* (2009.01)

(58) Field of Classification Search
CPC ........... H04W 74/0833; H04W 76/021; H04W 84/042
See application file for complete search history.

(56) References Cited

U.S. PATENT DOCUMENTS

| | | | |
|---|---|---|---|
| 2012/0039256 A1* | 2/2012 | Kwon | H04W 48/12 370/328 |
| 2012/0188878 A1* | 7/2012 | Simon | H04W 4/06 370/241 |
| 2014/0016569 A1 | 1/2014 | Chen et al. | |
| 2014/0247801 A1* | 9/2014 | Oizumi | H04L 5/0037 370/329 |
| 2015/0282042 A1 | 10/2015 | Griot et al. | |
| 2016/0338112 A1 | 11/2016 | Lee et al. | |
| 2017/0111886 A1* | 4/2017 | Kim | H04W 72/042 |
| 2017/0353915 A1* | 12/2017 | da Silva | H04W 48/18 |

OTHER PUBLICATIONS

ISA/EP, International Search Report and Written Opinion of the International Searching Authority, Int'l Application No. PCT/US2017/023515, Jun. 14, 2017, European Patent Office, Rijswijk, NL, 16 pgs.

Labib, et al., "Enhancing the Robustness of LTE Systems: Analysis and Evolution of the Cell Selection Process," IEEE Communications Magazine, Feb. 1, 2017, pp. 208-215, vol. 55. No, 2, XP011640293, ISSN: 0163-6804, DOI: 10.1109/MCOM.2017.1500706CM, Institute of Electrical and Electronics Engineers.

Qualcomm, "MulteFire Technology Progress and Benefits, and How It Enables a New Breed of Neutral Hosts," May 24, 2016, 26 pgs., XP055378284, Retrieved from the Internet: URL:https://www.qualcomm.com/documents/multefire-technology [retrieved on Jun. 2, 2017].

* cited by examiner

AUTOMATIC NETWORK SELECTION FOR MULTEFIRE

CROSS REFERENCES

The present Application for Patent claims priority to U.S. Provisional Patent Application No. 62/313,703 by Radulescu, et al., entitled "AUTOMATIC NETWORK SELECTION FOR MULTEFIRE," filed Mar. 25, 2016, assigned to the assignee hereof, and is hereby expressly incorporated by reference herein in its entirety.

BACKGROUND

The following relates generally to wireless communication and more specifically to automatic network selection for MuLTEFire or other local area network deployments.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may each be referred to as a user equipment (UE).

A base station may provide network wireless access to a number of UEs, and when a UE attempts to connect to the wireless node, there may be communication between the UE and the base station regarding a wide range of service providers from which the UE can select. In some cases, a UE may preferably locate a primary service provider for which they have network credentials. Thus, when a large number of UEs are attempting to attach to communicate with the base station, efficiency may be reduced due to a large amount of traffic associated with selecting a desired network, introducing latency and degrading the overall user experience.

SUMMARY

A user equipment (UE) may attempt to access a network at a local area network access point without prior context information, so the UE may seek to identify service providers supported by the network in broadcast information to expedite access. For example, the UE may attempt to access a hotspot operating in unlicensed spectrum according to a Long Term Evolution (LTE)-based standard, such as MuLTEFire. The UE may be unable to determine if it is authorized to access the network from a network identity broadcast, so the UE may attempt to obtain broadcast system information that provides a list of service providers supported by the network.

The UE may determine whether it has credentials for a supported service provider, and the UE may access the network using those credentials when a supported service provider is recognized. In some examples, the UE may decode other system information or broadcast messages to obtain information about a location or details of a system information block (SIB) that lists supported service providers. A UE that is unable to access the network using stored credentials may attempt access using a random access channel procedure.

A method of wireless communication is described. The method may include receiving a network identity broadcast, determining whether a network associated with the network identity broadcast supports access by a UE, and decoding a system information message for an indication of service providers supported by the network based at least in part on the determining being inconclusive.

An apparatus for wireless communication is described. The apparatus may include means for receiving a network identity broadcast, means for determining whether a network associated with the network identity broadcast supports access by a UE, and means for decoding a system information message for an indication of service providers supported by the network based at least in part on the determining being inconclusive.

Another apparatus for wireless communication is described. The apparatus may include a processor, memory in electronic communication with the processor, and instructions stored in the memory. The instructions may be operable to cause the processor to receive a network identity broadcast, determine whether a network associated with the network identity broadcast supports access by a UE, and decode a system information message for an indication of service providers supported by the network based at least in part on the determining being inconclusive.

A non-transitory computer readable medium for wireless communication is described. The non-transitory computer-readable medium may include instructions operable to cause a processor to receive a network identity broadcast, determine whether a network associated with the network identity broadcast supports access by a UE, and decode a system information message for an indication of service providers supported by the network based at least in part on the determining being inconclusive.

Some examples of the method, apparatus, and non-transitory computer-readable medium described above may further include processes, features, means, or instructions for receiving a broadcast message that indicates a presence of the system information message in a subsequent broadcast transmission, wherein the decoding the system information message may be based at least in part on receiving the broadcast message. In some examples of the method, apparatus, and non-transitory computer-readable medium described above, the system information message includes a list of service providers supported by the network.

In some examples of the method, apparatus, and non-transitory computer-readable medium described above, the broadcast message includes a field with a value set to indicate the presence of the system information message. In some examples of the method, apparatus, and non-transitory computer-readable medium described above, the broadcast message comprises a master information block (MIB). Some examples of the method, apparatus, and non-transitory computer-readable medium described above may further include processes, features, means, or instructions for receiving a system information block (SIB) that indicates a location of the system information message.

In some examples of the method, apparatus, and non-transitory computer-readable medium described above, the SIB may be SIB2 or an enhanced SIB (eSIB). In some examples of the method, apparatus, and non-transitory computer-readable medium described above, the SIB indicates whether a list of service providers comprises a comprehensive list of service providers supported by the network. In some examples of the method, apparatus, and non-transitory computer-readable medium described above, the SIB indicates a number of service providers included in a list of service providers supported by the network.

Some examples of the method, apparatus, and non-transitory computer-readable medium described above may further include processes, features, means, or instructions for decoding the system information message to obtain a list of service providers. Some examples of the method, apparatus, and non-transitory computer-readable medium described above may further include processes, features, means, or instructions for determining whether the list of service providers includes a service provider for which the UE may have credentials.

Some examples of the method, apparatus, and non-transitory computer-readable medium described above may further include processes, features, means, or instructions for determining that the list of service providers includes the service provider for which the UE may have credentials. Some examples of the method, apparatus, and non-transitory computer-readable medium described above may further include processes, features, means, or instructions for communicating with the network using the credentials of the service provider, wherein using the credentials comprises attaching to a mobility management entity (MME) of the network. In some examples of the method, apparatus, and non-transitory computer-readable medium described above, the list of service providers includes a plurality of service providers for which the UE may have credentials.

Some examples of the method, apparatus, and non-transitory computer-readable medium described above may further include processes, features, means, or instructions for determining that the list of service providers excludes the service provider for which the UE may have credentials. Some examples of the method, apparatus, and non-transitory computer-readable medium described above may further include processes, features, means, or instructions for communicating with the network using a non-access stratum (NAS) procedure. In some examples of the method, apparatus, and non-transitory computer-readable medium described above, the communicating comprises at least one of transmitting an indication of service providers for which the UE may have credentials, transmitting a requests for the list of service providers supported by the network, or receiving at least a partial list of service providers supported by the network.

In some examples of the method, apparatus, and non-transitory computer-readable medium described above, decoding the system information message comprises: blindly decoding the system information message. Some examples of the method, apparatus, and non-transitory computer-readable medium described above may further include processes, features, means, or instructions for determining that the system information message excludes the indication of service providers supported by the network. Some examples of the method, apparatus, and non-transitory computer-readable medium described above may further include processes, features, means, or instructions for performing a random access channel (RACH) procedure to access the network.

Some examples of the method, apparatus, and non-transitory computer-readable medium described above may further include processes, features, means, or instructions for transmitting an indication of whether the UE determined that it was authorized to access the network based on the received identity information, or transmitting an indication of whether the UE identified a service provider for which the UE may have credentials in another system information message. Some examples of the method, apparatus, and non-transitory computer-readable medium described above may further include processes, features, means, or instructions for communicating with the network using a NAS procedure based at least in part on performing the RACH procedure.

Some examples of the method, apparatus, and non-transitory computer-readable medium described above may further include processes, features, means, or instructions for determining that a list of service providers supported by the network may be incomplete or larger than a threshold size. Some examples of the method, apparatus, and non-transitory computer-readable medium described above may further include processes, features, means, or instructions for performing a RACH procedure to access the network.

Some examples of the method, apparatus, and non-transitory computer-readable medium described above may further include processes, features, means, or instructions for transmitting a request for the system information message to be broadcast by the network. In some examples of the method, apparatus, and non-transitory computer-readable medium described above, the request may be transmitted in a RACH message.

DETAILED DESCRIPTION

Figure 1:
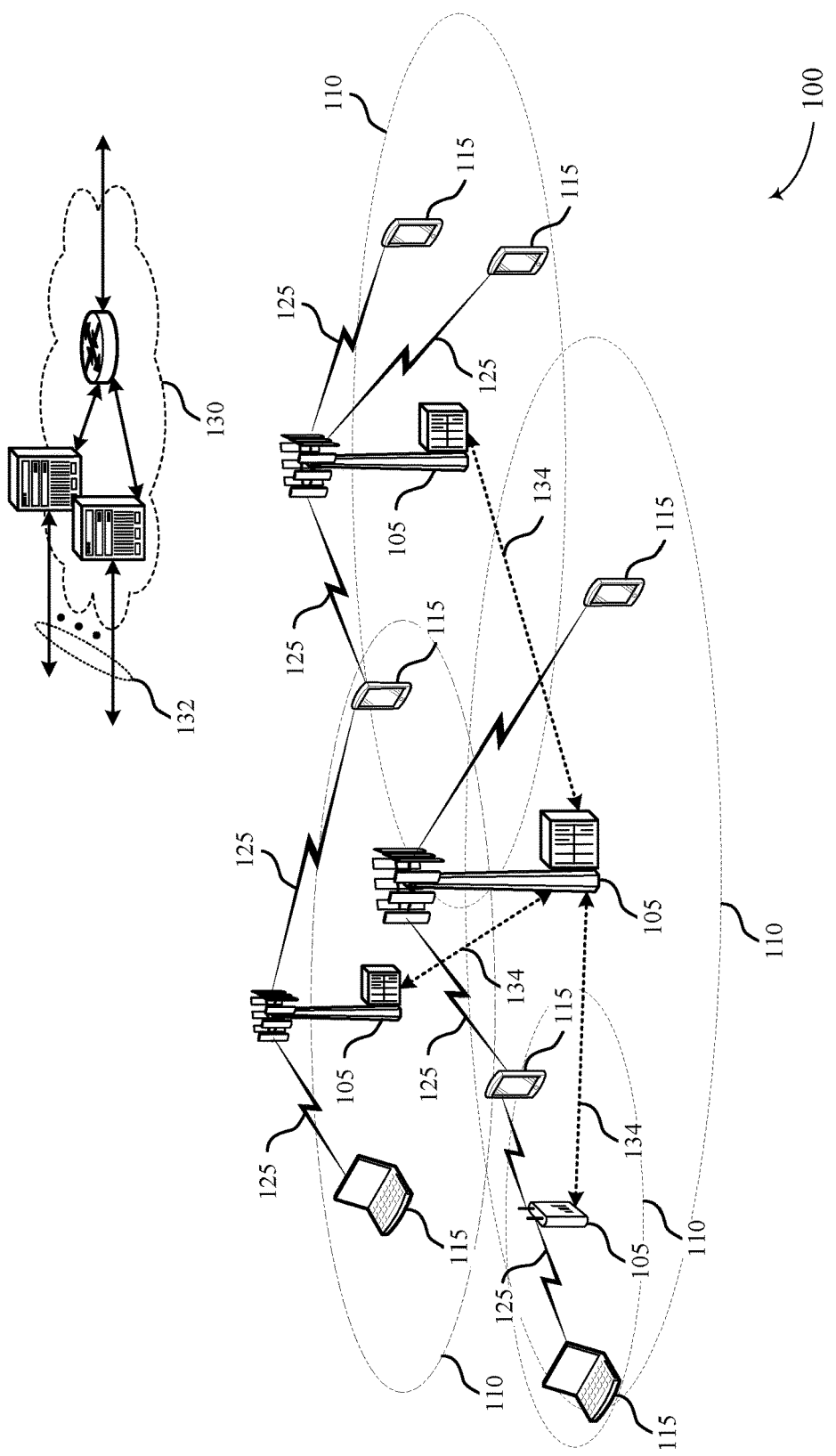
FIG. 1 illustrates an example of a wireless communications system that supports automatic network selection for MuLTEFire in accordance with aspects of the present disclosure.

A local area network may broadcast information about supported service providers in order to facilitate access by user equipment (UEs) without prior context for the network. For example, a base station may broadcast certain information following a request for the information from a UE (e.g., a probe request) or at certain intervals selected by a network entity or operator. Broadcast messages may include a network or service provider identity (ID) that enables UEs to connect to and communicate with a certain service provider or network. However, in some cases, the UE may be unable to detect whether it is authorized to communicate based on a network ID included in the broadcast (e.g., should the broadcast indicate a neutral host in an enhanced system information block (eSIB)). As a result, the UE may perform additional procedures to determine whether the deployment supports a service provider for which the UE already has credentials. But in some cases, the network may broadcast information about supported service providers (e.g., frequently used service providers) to expedite a UE's access procedures. In such cases, a UE may use an information block configuration (such as a master information block (MIB) configuration or an eSIB configuration) to determine whether a network identity broadcast of service provider IDs is available from a base station.

By way of example, to assist a UE with the determination of whether a system information broadcast of a service provider ID list is available, an information block configuration may include a flag that indicates a presence of a specific system information message (e.g., an SIB) in a broadcast transmission, and the system information message may include the list of service provider IDs. The UE may accordingly use the flag to determine whether a cell broadcast includes a list of service provider IDs that may be used to select from when connecting to the base station. In some cases, the location of the specific system information message may be configured within an eSIB, and the presence of the system information message may be indicated using a flag in a MIB. That is, a MIB may carry a flag or indicator that signals the presence of a scheduled SIB in a subsequent broadcast transmission. Additionally or alternatively, a flag indicating a network identity broadcast of the specific system information message including the service provider ID list may be included in an eSIB itself.

In some cases, there may not be a flag that indicates the presence of the specific system information message and a UE may perform a blind decoding of service provider IDs located in a specific SIB. Based on the blind decoding, if the network identity broadcast includes the list of service provider IDs, then the UE may acquire the list and proceed with identifying any matching service providers or using non-access stratum (NAS) procedures. Similarly, if the UE chooses not to decode the broadcast list, the UE may perform random access channel (RACH) procedures using flags to indicate whether the UE could find a matching network ID, whether the UE found a match from the system information message, or whether RACH succeeds as described above.

A UE may enter into the coverage area of the base station and determine if a broadcast of IDs is available, or whether to request a broadcast of service provider IDs or use different methods for connecting to the network (e.g., NAS procedures). In some cases, after the UE receives a network identity broadcast that indicates a number of service providers, the UE may still decide to use alternative connection techniques, such as when the list of service provider IDs is too long (e.g., based on a size of an indicated SIB that includes the list or based on the number of service provider IDs in the list), or when decoding the list may take a relatively long amount of time. The use of the service provider ID list coupled with a UEs ability to cross check credentials may reduce latency when communicating with a network.

Aspects of the disclosure introduced above are initially described in the context of a wireless communication system. Aspects of the disclosure are further illustrated by and described with reference to apparatus diagrams, system diagrams, and flowcharts that relate to automatic network selection for MuLTEFire.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. For example, wireless communications system 100 may include an LTE/LTE-A network, a MuLTEFire network, a neutral host small cell network, or the like, operating with overlapping coverage areas. A MuLTEFire network may include access points (APs) and/or base stations 105 communicating in an unlicensed radio frequency spectrum band, e.g., without a licensed frequency anchor carrier. For example, the MuLTEFire network may operate without an anchor carrier in the licensed spectrum. Wireless communications system 100 may support an indication or blind detection of a system information message that includes a list of service providers to enhance communication efficiency in wireless communications system 100.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device, etc. Base stations 105 may also be MuLTEFire base stations 105, which may have limited or non-ideal backhaul links 134 with other base stations 105.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

In some cases, a UE 115 or base station 105 may operate in a shared or unlicensed frequency spectrum. These devices may perform a clear channel assessment (CCA) prior to communicating in order to determine whether the channel is available. A CCA may include an energy detection procedure to determine whether there are any other active transmissions. For example, the device may infer that a change in a received signal strength indication (RSSI) of a power meter indicates that a channel is occupied. Specifically, signal power that is concentrated in a certain bandwidth and exceeds a predetermined noise floor may indicate another wireless transmitter. A CCA may also include detection of specific sequences that indicate use of the channel. For example, another device may transmit a specific preamble prior to transmitting a data sequence. UEs 115 and base stations 105 operating in licensed or unlicensed spectrum may transmit discovery reference signals (DRS) to convey information for identifying of establishing a radio connection.

For example, DRS may include primary and secondary synchronization signals to enable a UE 115 to identify the timing and frequency range of a cell. After completing initial cell synchronization, a UE 115 may decode the MIB. The MIB may be transmitted on a physical broadcast channel (PBCH) and may utilize the first 4 orthogonal frequency division multiple access (OFDMA) symbols of the second slot of the first subframe of each radio frame. The MIB may use the middle 6 resource block (RBs) (72 subcarriers) in the frequency domain. The MIB may include a few important pieces of information for UE initial access, including DL channel bandwidth in term of RBs, physical HARQ indicator channel (PHICH) configuration (duration and resource assignment), and system frame number (SFN). In some cases, the MIB may indicate a location of another system information message (e.g., a message including an SIB) that includes information or an indication of service providers supported by a network. A new MIB may be broadcast every fourth radio frame (SFN mod 4=0) at and rebroadcast every frame (10 ms). Each repetition is scrambled with a different scrambling code.

After reading a MIB (either a new version or a copy), the UE 115 may can try different phases of a scrambling code until it gets a successful cyclic redundancy check (CRC). The phase of the scrambling code (0, 1, 2 or 3) may enable the UE 115 to identify which of the four repetitions has been received. Thus, the UE 115 may determine the current SFN by reading the SFN in the decoded transmission and adding the scrambling code phase.

After receiving the MIB, a UE may receive one or more system information block (SIBs). Different SIBs may be defined according to the type of system information (SI) conveyed and they may be defined for licensed frequency operation or unlicensed frequency operation, or both. As described below, certain SIBs may be used by UEs 115 operating under a MuLTEFire scheme within wireless communications system 100, while other SIBs may be used by UEs 115 operating on licensed frequencies.

For example, a UE 115 operating on licensed frequencies may decode SIB1 and SIB2, in addition to the MIB, prior to accessing the network. A new SIB1 may be transmitted in the fifth subframe of every eighth frame (SFN mod 8=0) and rebroadcast every other frame (20 ms). SIB1 includes access information, including cell identity (CID) information, and the access information may indicate whether a UE 115 is allowed to camp on a cell of a base station 105. SIB1 also includes cell selection information (or cell selection parameters). Additionally, SIB1 includes scheduling information for other SIBs. SIB2 may be scheduled dynamically according to information in SIB1, and includes access information and parameters related to common and shared channels. The periodicity of SIB2 can be set to 8, 16, 32, 64, 128, 256 or 512 radio frames. In some cases, the periodicity and configuration of MIB and SIBS may be different for cells operating in licensed and unlicensed spectrum.

After the UE 115 decodes SIB2, it may transmit a RACH preamble to a base station 105. This may be known as RACH message 1. For example, the RACH preamble may be randomly selected from a set of 64 predetermined sequences. This may enable the base station 105 to distinguish between multiple UEs 115 trying to access the system simultaneously. The base station 105 may respond with a random access response (RAR), or RACH message 2, that provides an UL resource grant, a timing advance and a temporary cell radio network temporary identity (C-RNTI). The UE 115 may then transmit an radio resource control (RRC) connection request, or RACH message 3, along with a temporary mobile subscriber identity (TMSI) (if the UE 115 has previously been connected to the same wireless network) or a random identifier.

The RRC connection request may also indicate the reason the UE 115 is connecting to the network (e.g., emergency, signaling, data exchange, etc.). The base station 105 may respond to the connection request with a contention resolution message, or RACH message 4, addressed to the UE 115, which may provide a new C-RNTI. If the UE 115 receives a contention resolution message with the correct identification, the UE 115 may proceed with RRC setup. If the UE 115 does not receive a contention resolution message (e.g., if there is a conflict with another UE 115) it may repeat the RACH process by transmitting a new RACH preamble.

For UEs 115 operating on unlicensed frequencies, including those operating on MuLTEFire portions of wireless communications system 100, the UE 115 may decode an eSIB. The eSIB may be broadcast (e.g., on a PBCH) and may include system information equivalent to some fields or information included in other SIBs. For example, the eSIB may include information that may also be conveyed in SIB1 and SIB2 in licensed frequency operation, as described above. In some cases, the eSIB may include an indication of subframe configurations including, for example, whether certain subframes are multimedia broadcast single frequency network (MBSFN) subframes. The eSIB may support unlicensed operation because it may quickly provide information (e.g., frame-type or subframe configuration) to a UE 115 after cell acquisition.

In some cases, wireless communications system 100 may utilize enhanced component carriers (eCCs). An eCC may be characterized by one or more features including: wider bandwidth, shorter symbol duration, shorter transmission time intervals (TTIs), and modified control channel configuration. In some cases, an eCC may be associated with a carrier aggregation (CA) configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

Wireless communications system 100 may employ a downlink broadcast of data from a base station 105 requested by one or more UEs 115 within its coverage area. For example, a base station 105 may broadcast certain information following a request for the information from a UE 115 (e.g., a probe request). In some cases, the base station 105 may not broadcast the information unless responding to a request from a UE 115. Broadcast messages may include a network or service provider ID that enables UEs 115 to connect to and communicate with a certain service provider or network. However, in some cases, the UE 115 may not be able to detect whether it is authorized to communicate based on a network ID included in the broadcast (e.g., should the broadcast indicate a neutral host in an eSIB). As a result, the UE 115 may perform additional procedures to determine whether the deployment supports any of the service providers for which the UE 115 has credentials.

Figure 2:
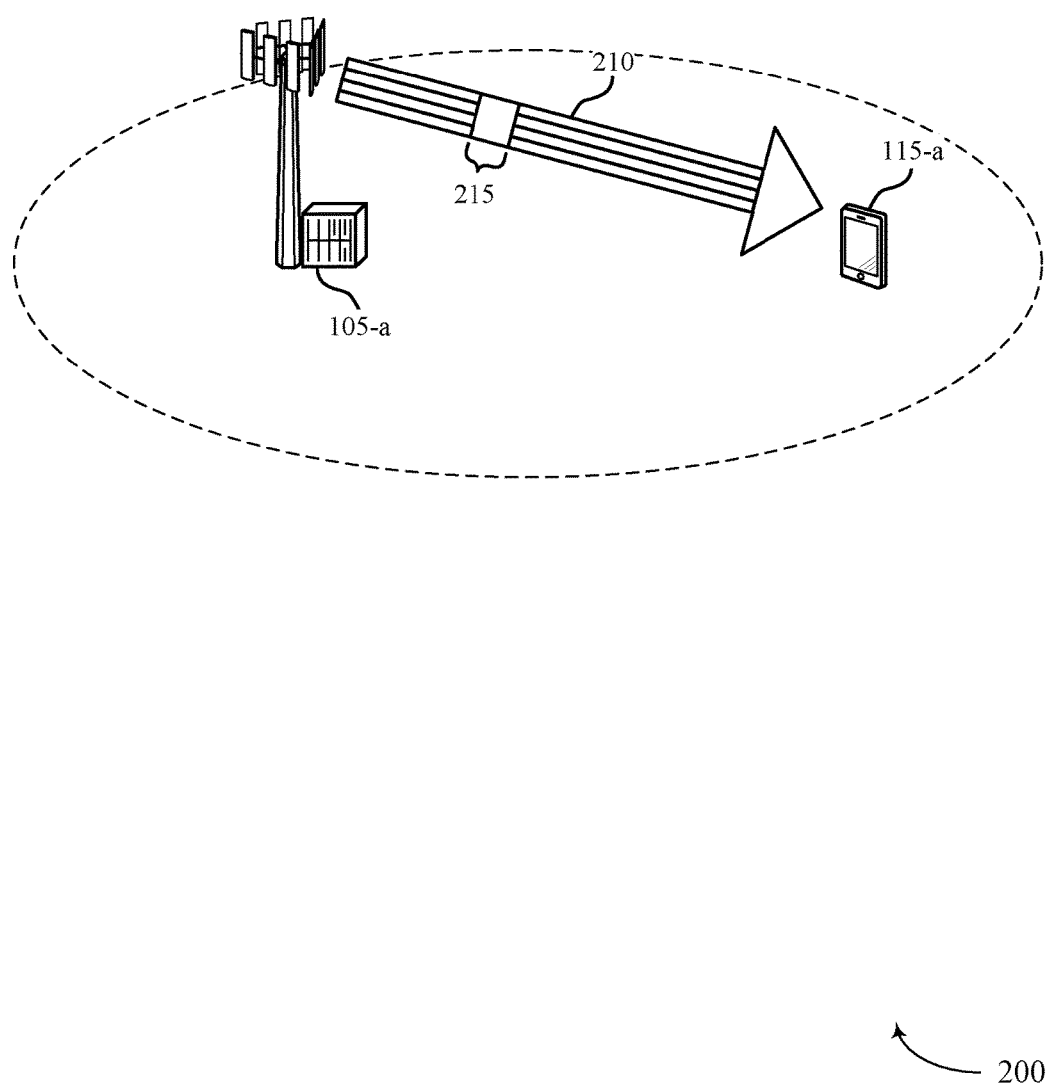
FIG. 2 illustrates an example of a wireless communications system that supports automatic network selection for MuLTEFire in accordance with aspects of the present disclosure.

FIG. 2 illustrates an example of a wireless communications system 200 for automatic network selection for MuLTEFire. Wireless communications system 200 may include base station 105-a and UE 115-a, which may be examples of the corresponding devices described with reference to FIG. 1. Wireless communications system 200 illustrates an example of service provider selection using an information block configuration and blind detection.

In wireless communications system 200, UE 115-a may use an information block configuration to determine whether a network identity broadcast 210 from base station 105-a includes a system information message 215, where system information message 215 may include service provider IDs. For example, UE 115-a may determine the presence of system information message 215 based on an indicator included in the information block configuration (e.g., a flag within a MIB). UE 115-a may thus enter into the coverage area of base station 105-a and determine if a broadcast of service provider IDs is available, whether to request a broadcast of service provider IDs, or use different methods for connecting to the network (e.g., NAS procedures). In some examples, after UE 115-a receives network identity broadcast 210 including system information message 215 that indicates a number of service provider IDs, UE 115-a may still decide to use alternative attachment procedures, such as when the list of service providers is too long (e.g., based on a size of system information message 215 that includes the list or based on the number of service provider IDs in the list), or when decoding the list may take a relatively long amount of time.

To assist UE 115-a with the determination of whether a service provider ID list is available in a base station broadcast, UE 115-a may monitor for a frequently broadcast indication. That is, an information block configuration (such as a MIB configuration or an eSIB configuration) may include a flag that indicates the presence of system information message 215 that may include a list of service provider IDs within a broadcast message (e.g., such as a list of frequently used service provider IDs included in system information message 215 of network identity broadcast 210). UE 115-a may use the flag to determine whether network identity broadcast 210 includes system information message 215 and, if present, UE 115-a may determine a list of service provider IDs to select from when connecting to base station 105-a. In some cases, base station 105-a may broadcast system information message 215 if requested to do so by UE 115-a. For example, UE 115-a may send an indication (such as using a RACH message 3 or 5) of whether UE 115-a may benefit from a network identity broadcast, such as when UE 115-a may not be able to determine authorization status from a MuLTEfire ID.

In some examples, the location of system information message 215 that includes the list of service provider IDs may be configured within an eSIB, and the presence of system information message 215 may be further indicated using a flag or indicator in a MIB. Additionally or alternatively, the flag indicating a broadcast of system information message 215 may be included in an eSIB itself. In some cases, system information message 215 may include an SIB or an eSIB.

In some examples, when network identity broadcast 210 includes a list of service provider IDs, UE 115-a may acquire the list of service provider IDs (such as service provider hashes or identifiers) from the indicated system information message 215. In some cases, there may be a match between the stored credentials of UE 115-a and the service provider list obtained from system information message 215. UE 115-a may then proceed to attach to a mobility management entity (MME) based on the selected credentials. In some cases, this may be achieved through automatic selection.

In some cases, the service provider list included in system information message 215 may not include a match with a particular service provider, and UE 115-a may use NAS procedures to connect to a network. In some examples, UE 115-a may supply, to the MME, a list of UE-stored service providers for which UE 115-a possesses credentials. UE 115-a may also request the MME provide a full list of service providers. In response, the MME may return a list of matching service providers or the full list of supported service providers. In some cases, UE 115-a may subsequently undergo either automatic or manual selection, depending on whether there is a match included in the received list.

In some cases, UE 115-a may receive the list of service providers and decide not to use the list (e.g., if the list is too large, or system information message 215 containing the list is too large) or decide to use other means to attach to a network. As a result, UE 115-a may alternatively perform a RACH procedure, and use a message to indicate (e.g., using one of a RACH message 1 or 5) one or more flags that signal whether UE 115-a could find a matching network ID, whether UE 115-a found a match from the system information message 215, or whether RACH succeeds (where, if successful, the UE may proceed with a NAS procedure as described above). In some cases, UE 115-a may indicate whether it could have benefited from a broadcast that included system information message 215 with service provider IDs (e.g., using a RACH message 3 or 5).

In some cases, there may not be a flag that indicates the presence of the service provider list, and UE 115-a may perform a blind decoding of a service provider IDs located in system information message 215. That is, UE 115-a may perform a blind detection of whether a broadcast contains system information message 215 and a corresponding list of service provider IDs within system information message 215. In some cases, a location of system information message 215 including the list of service provider IDs may be configured in an eSIB, and the decision may be left to base station 105-a whether to broadcast the location or not. Base station 105-a may choose to start broadcasting an information block configuration based on receiving a number or a proportion of RACH requests with a flag that indicates whether UE 115-a could not find a match as described above (e.g., an indication flag may be set to "false").

Based on the blind decoding, if the broadcast includes the list of service provider IDs in system information message 215, then UE 115-a may acquire the list and proceed with identifying any matching service providers or using NAS procedures as described above. Similarly, if UE 115-a chooses not to decode the broadcast list, UE 115-a may perform the RACH procedures using flags to indicate whether UE 115-a could find a matching network ID, whether UE 115-a found a service provider match from the system information message 215, or whether RACH succeeds, as described above.

Figure 3:
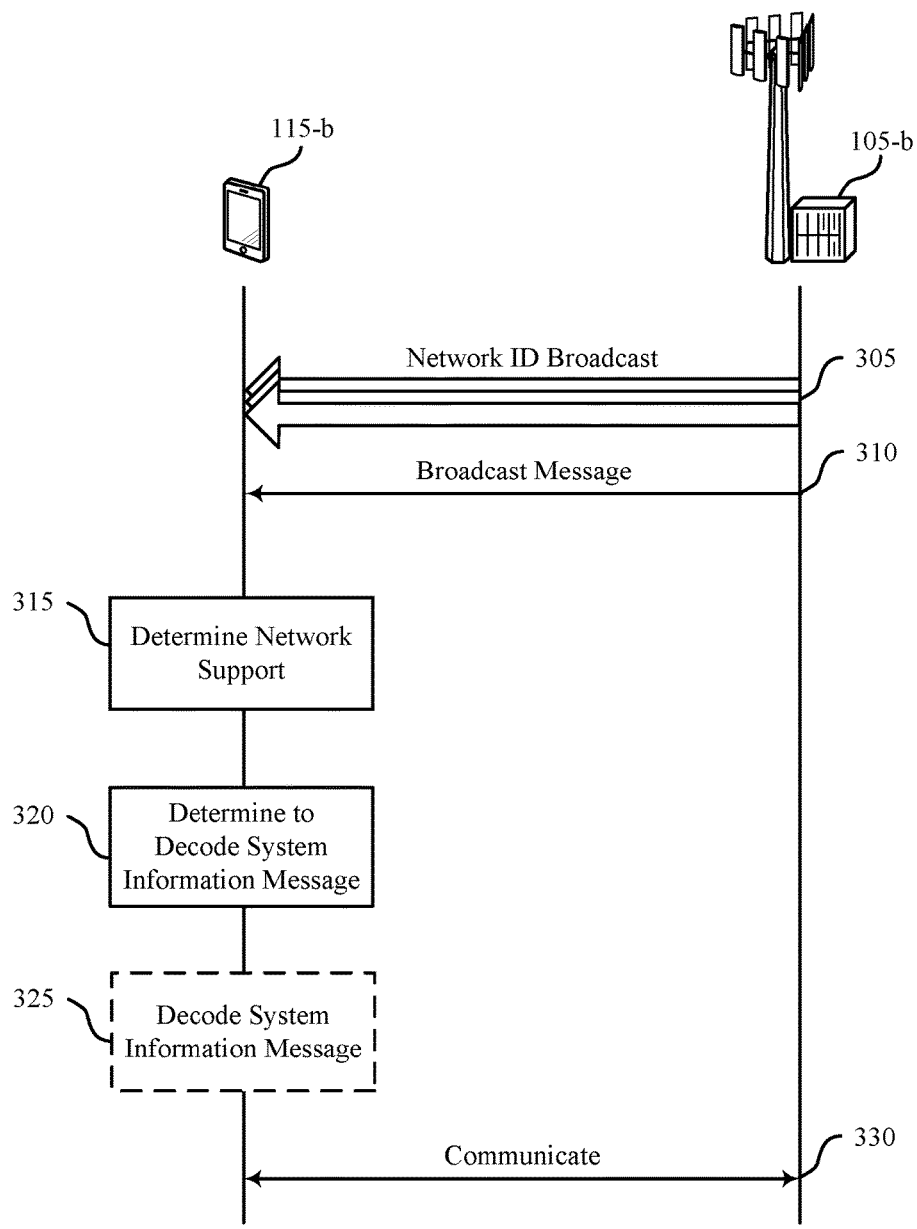
FIG. 3 illustrates an example of a process flow in a system that supports automatic network selection for MuLTEFire in accordance with aspects of the present disclosure.

FIG. 3 illustrates an example of a process flow 300 for automatic network selection for MuLTEFire in accordance with various aspects of the present disclosure. Process flow 300 may include base station 105-a and UE 115-a, which may be examples of the corresponding devices described with reference to FIG. 1-2.

At step 305, base station 105-b may transmit, and UE 115-b may receive a network identity broadcast. At step 310, UE 115-b may receive a broadcast message that indicates that a system information message is present in a subsequent broadcast transmission, where the system information message includes a list of service providers. In some cases, the broadcast message may include a field with a value set to indicate that the system information message is present. The list of service providers may include multiple service providers for which UE 115-*b* has credentials. In some examples, the broadcast message includes a MIB. Additionally or alternatively, UE 115-*b* may receive an eSIB that indicates a location of the system information message.

In some cases, UE 115-*b* may receive an SIB that indicates a location of the system information message, where the SIB is SIB2 or an eSIB. The SIB may also indicate whether the list of service providers includes a comprehensive list of service providers supported by the network and/or a number of service providers included in the list of service providers supported by the network. At step 315, UE 115-*b* may determine whether a network associated with the network identity broadcast supports access by UE 115-*b*.

At step 320, UE 115-*b* may decode the system information message for an indication of service providers supported by the network based on the determining being inconclusive. In some cases, decoding the system information message is based on receiving the broadcast message.

At step 325, UE 115-*b* may optionally decode the system information message to obtain the list of service providers and determine whether the list of service providers includes a service provider for which UE 115-*b* has credentials. In some cases, UE 115-*b* may determine that the list of service providers includes a service provider for which UE 115-*b* has credentials. In some cases, decoding the system information message includes blindly decoding the system information message.

In some cases, UE 115-*b* may determine that the system information message excludes the indication of service providers supported by the network and may perform a RACH procedure to access the network. UE 115-*b* may also transmit an indication of whether UE 115-*b* determined that it was authorized to access the network based on the received identity information or transmit an indication of whether UE 115-*b* identified the service provider for which UE 115-*b* has credentials in another system information message.

At step 330, UE 115-*b* may communicate with the network (e.g., through base station 105-*b*) using the credentials of the service provider, where using the credentials includes attaching to a MME of the network. In some examples, UE 115-*b* may determine that the list of service providers excludes a service provider for which UE 115-*b* has credentials, and UE 115-*b* may communicate with the network using a NAS procedure.

In some cases, communicating with the network includes transmitting an indication of service providers for which UE 115-*b* has credentials, transmitting a requests for a list of service providers supported by the network, or receiving at least a partial list of the service providers supported by the network. Additionally or alternatively, communicating with the network may include transmitting an indication of service providers for which UE 115-*b* has credentials, transmitting a requests for a list of service providers supported by the network, or receiving at least a partial list of the service providers supported by the network.

Figure 4:
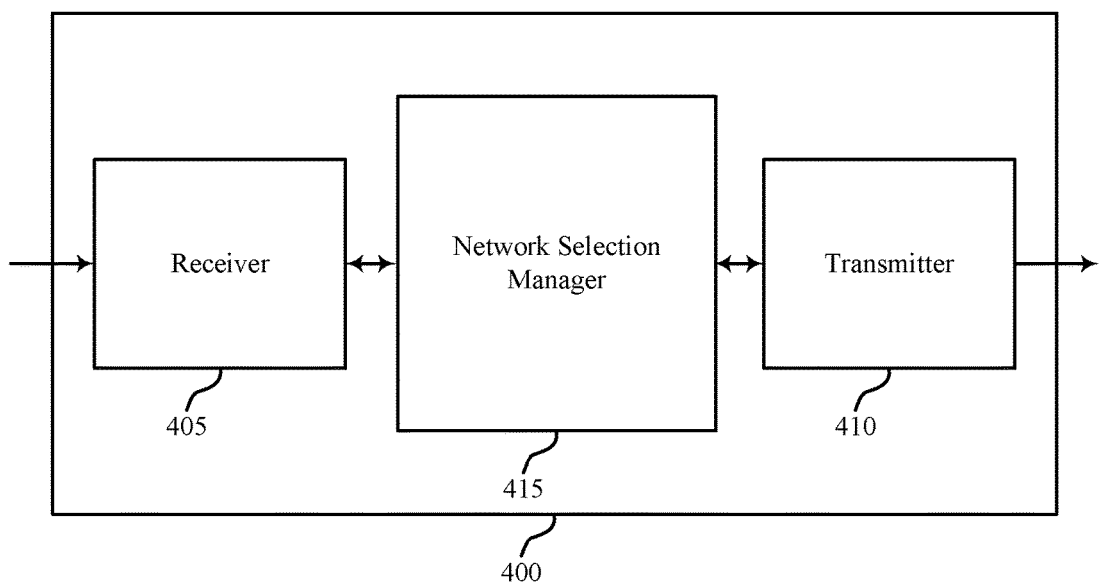
FIGS. 4 through 6 show block diagrams of a wireless device that supports automatic network selection for MuLTEFire in accordance with aspects of the present disclosure.

FIG. 4 shows a block diagram of a wireless device 400 that supports automatic network selection for MuLTEFire in accordance with various aspects of the present disclosure. Wireless device 400 may be an example of aspects of a UE 115 described with reference to FIGS. 1 and 2. Wireless device 400 may include receiver 405, transmitter 410, and network selection manager 415. Wireless device 400 may also include a processor. Each of these components may be in communication with each other.

The receiver 405 may receive information such as packets, user data, or control information associated with various information channels (e.g., control channels, data channels, and information related to automatic network selection for MuLTEFire, etc.). Information may be passed on to other components of the device. The receiver 405 may be an example of aspects of the transceiver 725 described with reference to FIG. 7.

The transmitter 410 may transmit signals received from other components of wireless device 400. In some examples, the transmitter 410 may be collocated with a receiver in a transceiver module. For example, the transmitter 410 may be an example of aspects of the transceiver 725 described with reference to FIG. 7. The transmitter 410 may include a single antenna, or it may include a plurality of antennas.

The network selection manager 415 may receive a network identity broadcast, determine whether a network associated with the network identity broadcast supports access by a UE 115, and decode a system information message for an indication of service providers supported by the network based on the determining being inconclusive. The network selection manager 415 may also be an example of aspects of the network selection manager 705 described with reference to FIG. 7.

Figure 5:
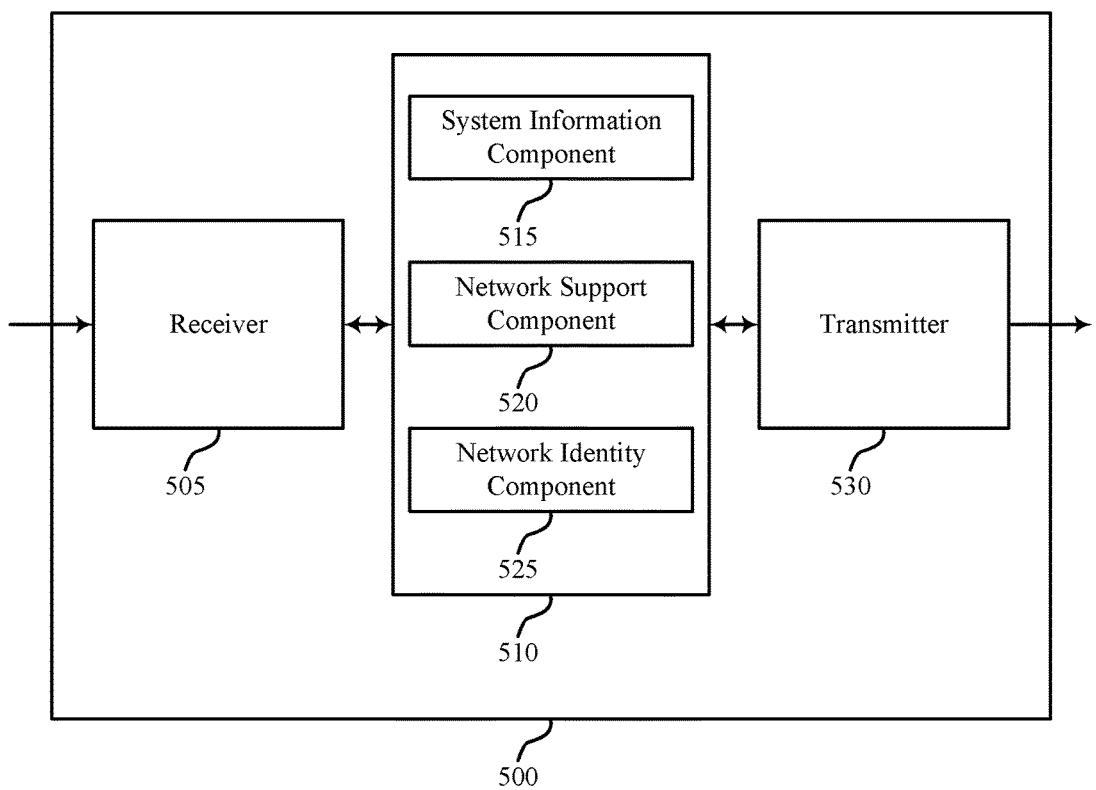

FIG. 5 shows a block diagram of a wireless device 500 that supports automatic network selection for MuLTEFire in accordance with various aspects of the present disclosure. Wireless device 500 may be an example of aspects of a wireless device 400 or a UE 115 described with reference to FIGS. 1, 2, and 4. Wireless device 500 may include receiver 505, network selection manager 510 and transmitter 530. Wireless device 500 may also include a processor. Each of these components may be in communication with each other.

The receiver 505 may receive information which may be passed on to other components of the device. The receiver 505 may also perform the functions described with reference to the receiver 405 of FIG. 4. The receiver 505 may be an example of aspects of the transceiver 725 described with reference to FIG. 7.

The network selection manager 510 may be an example of aspects of network selection manager 415 described with reference to FIG. 4. The network selection manager 510 may include system information component 515, network support component 520, and network identity component 525. The network selection manager 510 may be an example of aspects of the network selection manager 705 described with reference to FIG. 7.

The system information component 515 may decode a system information message for an indication of service providers supported by the network based on the determining being inconclusive. In some examples, the system information component 515 may receive a broadcast message that indicates a presence of the system information message in a subsequent broadcast transmission, where the decoding the system information message is based on receiving the broadcast message. In some examples, the system information message includes a list of service providers supported by the network. In some cases, decoding the system information message includes blindly decoding the system information message. The network support component 520 may determine whether a network associated with the network identity broadcast supports access by a UE 115. The network identity component 525 may receive a network identity broadcast.

The transmitter 530 may transmit signals received from other components of wireless device 500. In some examples, the transmitter 530 may be collocated with a receiver in a transceiver module. For example, the transmitter 530 may be an example of aspects of the transceiver 725 described with reference to FIG. 7. The transmitter 530 may utilize a single antenna, or it may utilize a plurality of antennas.

Figure 6:
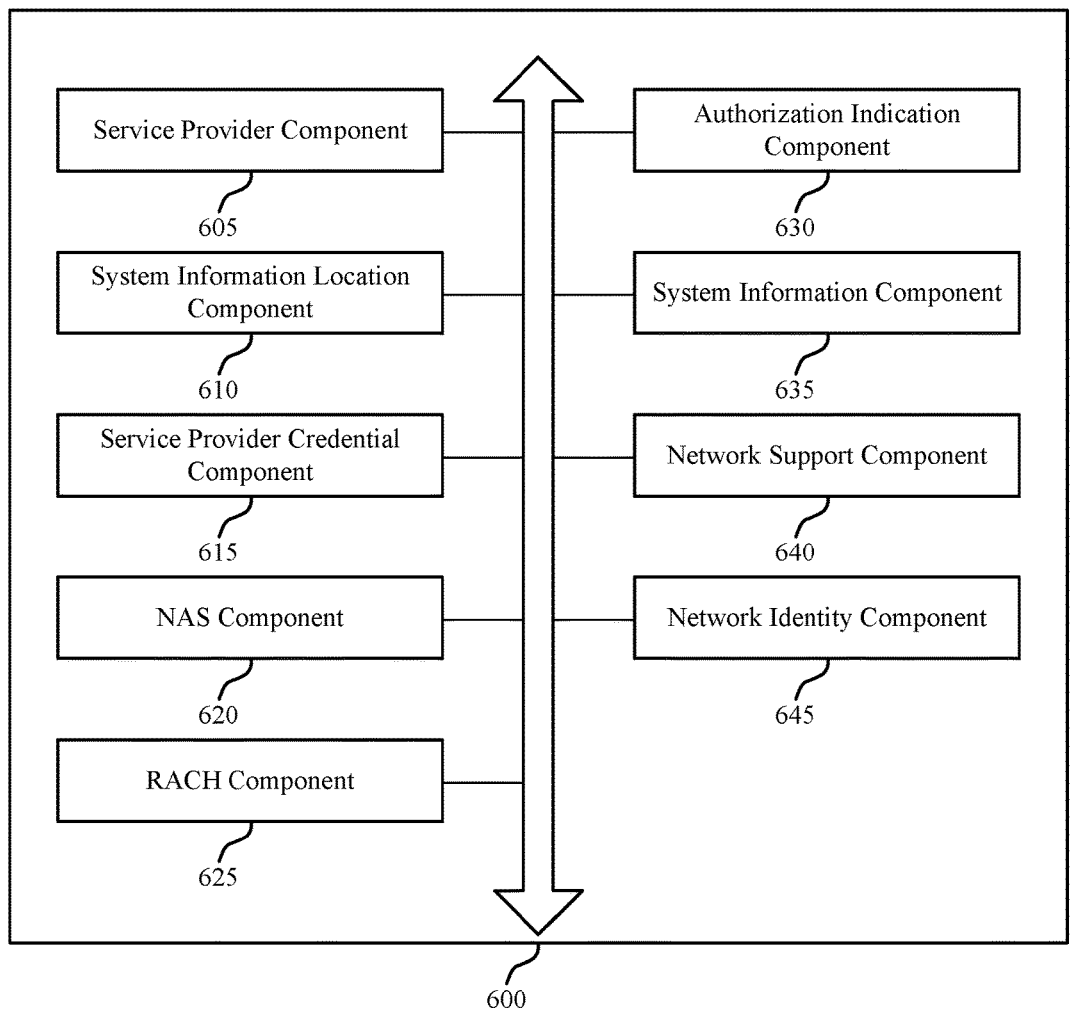

FIG. 6 shows a block diagram of a network selection manager 600 which may be an example of the corresponding component of wireless device 400 or wireless device 500. That is, network selection manager 600 may be an example of aspects of network selection manager 415 or network selection manager 510 described with reference to FIGS. 4 and 5. The network selection manager 600 may also be an example of aspects of the network selection manager 705 described with reference to FIG. 7.

The network selection manager 600 may include service provider component 605, system information location component 610, service provider credential component 615, NAS component 620, RACH component 625, authorization indication component 630, system information component 635, network support component 640, and network identity component 645. Each of these modules may communicate, directly or indirectly, with one another (e.g., via one or more buses).

The service provider component 605 may decode the system information message to obtain the list of service providers, transmit a requests for a list of service providers supported by the network, or receive at least a partial list of the service providers supported by the network. In some cases, the service provider component 605 may determine that the system information message excludes the indication of service providers supported by the network, determine that a list of service providers supported by the network is incomplete or larger than a threshold size.

The system information location component 610 may receive an SIB that indicates a location of the system information message. In some cases, the other SIB is an SIB2 or an eSIB. In some cases, the other SIB indicates whether the list of service providers includes a comprehensive list of service providers supported by the network. In some cases, the other SIB indicates a number of service providers included in the list of service providers supported by the network.

The service provider credential component 615 may determine whether the list of service providers includes a service provider for which the UE 115 has credentials. That is, the service provider credential component 615 may determine that the list of service providers includes the service provider for which the UE 115 has credentials or may determine that the list of service providers excludes a service provider for which the UE 115 has credentials. In some cases, the list of service providers includes a set of service providers for which the UE 115 has credentials. In some cases, the communicating includes at least transmitting an indication of service providers for which the UE 115 has credentials.

The NAS component 620 may communicate with the network using the credentials of the service provider, where using the credentials includes attaching to a MME of the network, and communicating with the network using a NAS procedure. The RACH component 625 may perform a RACH procedure to access the network, communicate with the network using a NAS procedure based on performing the RACH procedure, and perform a RACH procedure to access the network. In some cases, the communicating includes at least one of: transmitting an indication of service providers for which a UE 115 has credentials, transmitting a requests for a list of service providers supported by the network, or receiving at least a partial list of the service providers supported by the network.

The authorization indication component 630 may transmit an indication of whether the UE 115 determined that it was authorized to access the network based on the received identity information. The authorization indication component 630 may also transmit an indication of whether the UE 115 identified the service provider for which the UE 115 has credentials in another system information message.

The system information component 635 may decode a system information message for an indication of service providers supported by the network based on the determining being inconclusive. In some cases, decoding the system information message includes blindly decoding the system information message. In some cases, system information component 635 may receive a broadcast message that indicates a presence of the system information message in a subsequent broadcast, where the system information message may include a list of service providers supported by the network. In some cases, the decoding the system information message is based on receiving the broadcast message.

In some cases, the broadcast message includes a field with a value set to indicate the presence of the system information message. Additionally or alternatively, the broadcast message includes a MIB. The network support component 640 may determine whether a network associated with the network identity broadcast supports access by the UE 115. The network identity component 645 may receive a network identity broadcast.

Figure 7:
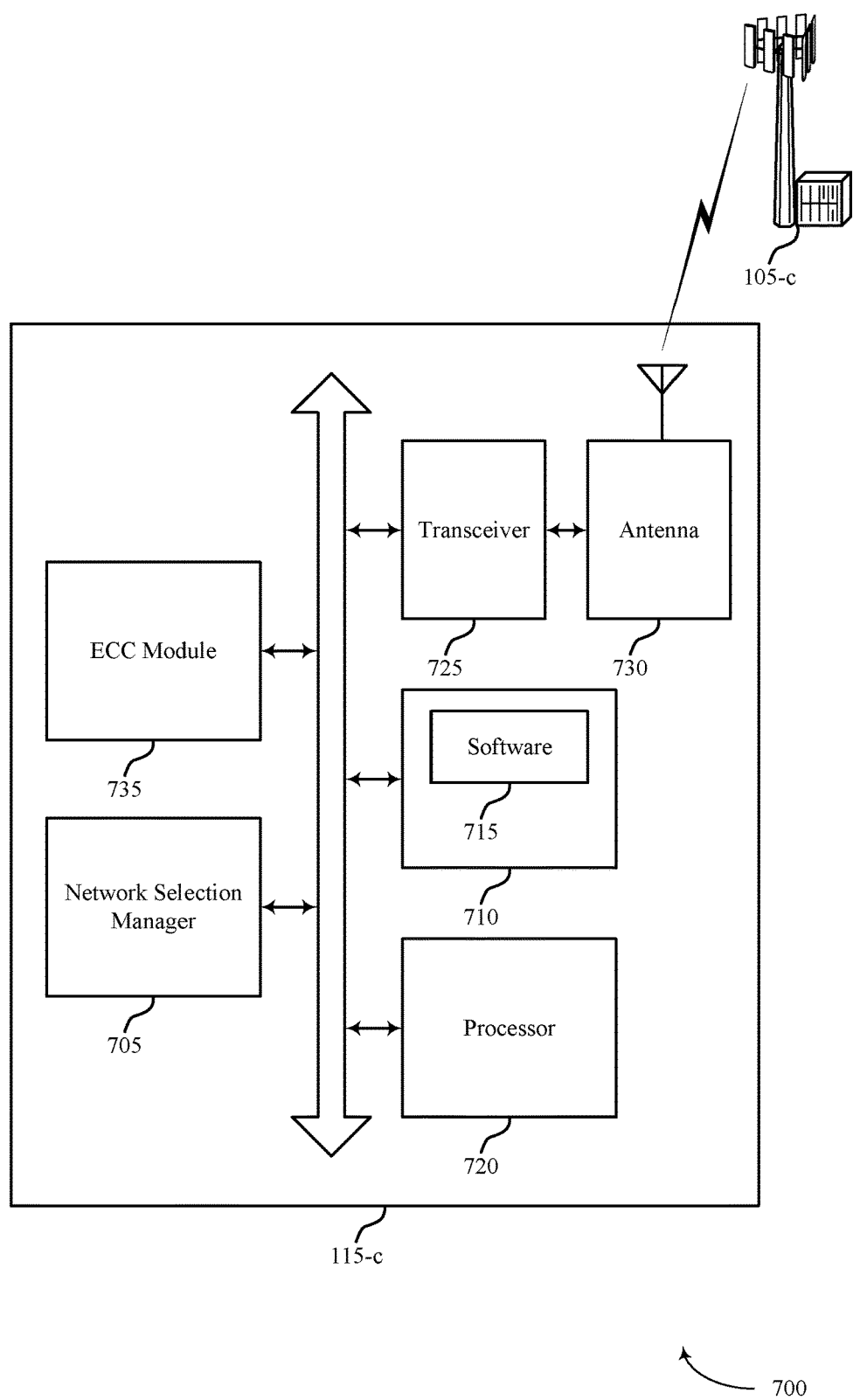
FIG. 7 illustrates a block diagram of a system including a UE that supports automatic network selection for MuLTEFire in accordance with aspects of the present disclosure.

FIG. 7 shows a diagram of a system 700 including a device that supports automatic network selection for MuLTEFire in accordance with various aspects of the present disclosure. For example, system 700 may include UE 115-c, which may be an example of a wireless device 400, a wireless device 500, or a UE 115 as described with reference to FIGS. 1, 2, and 4 through 6.

UE 115-c may also include network selection manager 705, memory 710, processor 720, transceiver 725, antenna 730, and ECC module 735. Each of these modules may communicate, directly or indirectly, with one another (e.g., via one or more buses). The network selection manager 705 may be an example of a network selection manager as described with reference to FIGS. 4 through 6.

The memory 710 may include random access memory (RAM) and read only memory (ROM). The memory 710 may store computer-readable, computer-executable software including instructions that, when executed, cause the processor to perform various functions described herein (e.g., automatic network selection for MuLTEFire, etc.). In some cases, the software 715 may not be directly executable by the processor but may cause a computer (e.g., when compiled and executed) to perform functions described herein. The processor 720 may include an intelligent hardware device, (e.g., a central processing unit (CPU), a microcontroller, an application specific integrated circuit (ASIC), etc.).

The transceiver 725 may communicate bi-directionally, via one or more antennas, wired, or wireless links, with one or more networks, as described above. For example, the transceiver 725 may communicate bi-directionally with a base station 105 or a UE 115. The transceiver 725 may also include a modem to modulate the packets and provide the modulated packets to the antennas for transmission, and to demodulate packets received from the antennas. In some cases, the wireless device may include a single antenna 730. However, in some cases the device may have more than one antenna 730, which may be capable of concurrently transmitting or receiving multiple wireless transmissions. ECC module 735 may enable operations using ECCs such as communication using shared or unlicensed spectrum, using reduced TTIs or subframe durations, or using a large number of component carriers.

Figure 8:
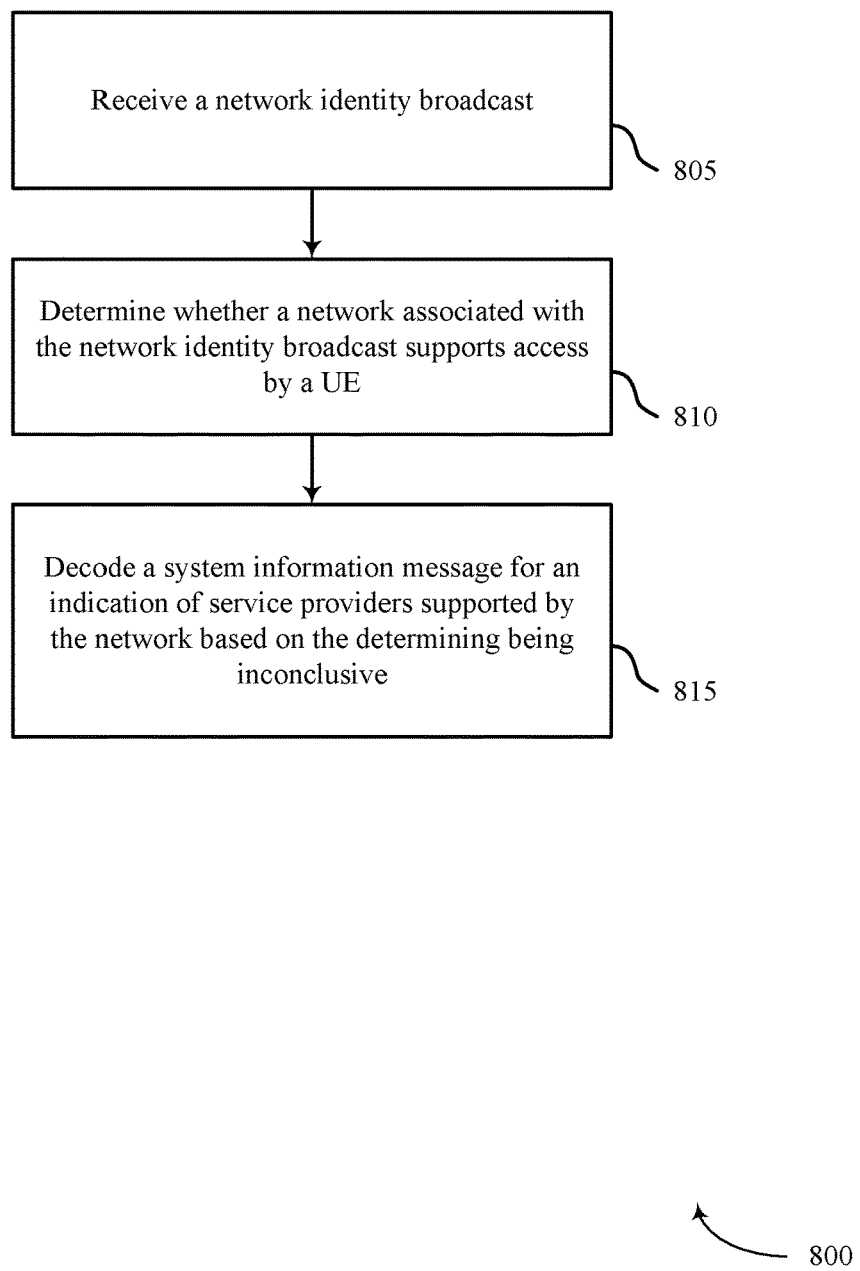
FIGS. 8 through 13 illustrate methods for automatic network selection for MuLTEFire in accordance with aspects of the present disclosure.

FIG. 8 shows a flowchart illustrating a method 800 for automatic network selection for MuLTEFire in accordance with various aspects of the present disclosure. The operations of method 800 may be implemented by a device such as a UE 115 or its components as described with reference to FIGS. 1 and 2. For example, the operations of method 800 may be performed by the network selection manager as described herein. In some examples, the UE 115 may execute a set of codes to control the functional elements of the device to perform the functions described below. Additionally or alternatively, the UE 115 may perform aspects of the functions described below using special-purpose hardware.

At block 805, the UE 115 may receive a network identity broadcast as described above with reference to FIGS. 2 through 3. In certain examples, the operations of block 805 may be performed by the network identity component as described with reference to FIGS. 5 and 6.

At block 810, the UE 115 may determine whether a network associated with the network identity broadcast supports access by the UE 115 as described above with reference to FIGS. 2 through 3. In certain examples, the operations of block 810 may be performed by the network support component as described with reference to FIGS. 5 and 6.

At block 815, the UE 115 may decode a system information message for an indication of service providers supported by the network based on the determining being inconclusive as described above with reference to FIGS. 2 through 3. In certain examples, the operations of block 815 may be performed by the system information component as described with reference to FIGS. 5 and 6.

Figure 9:
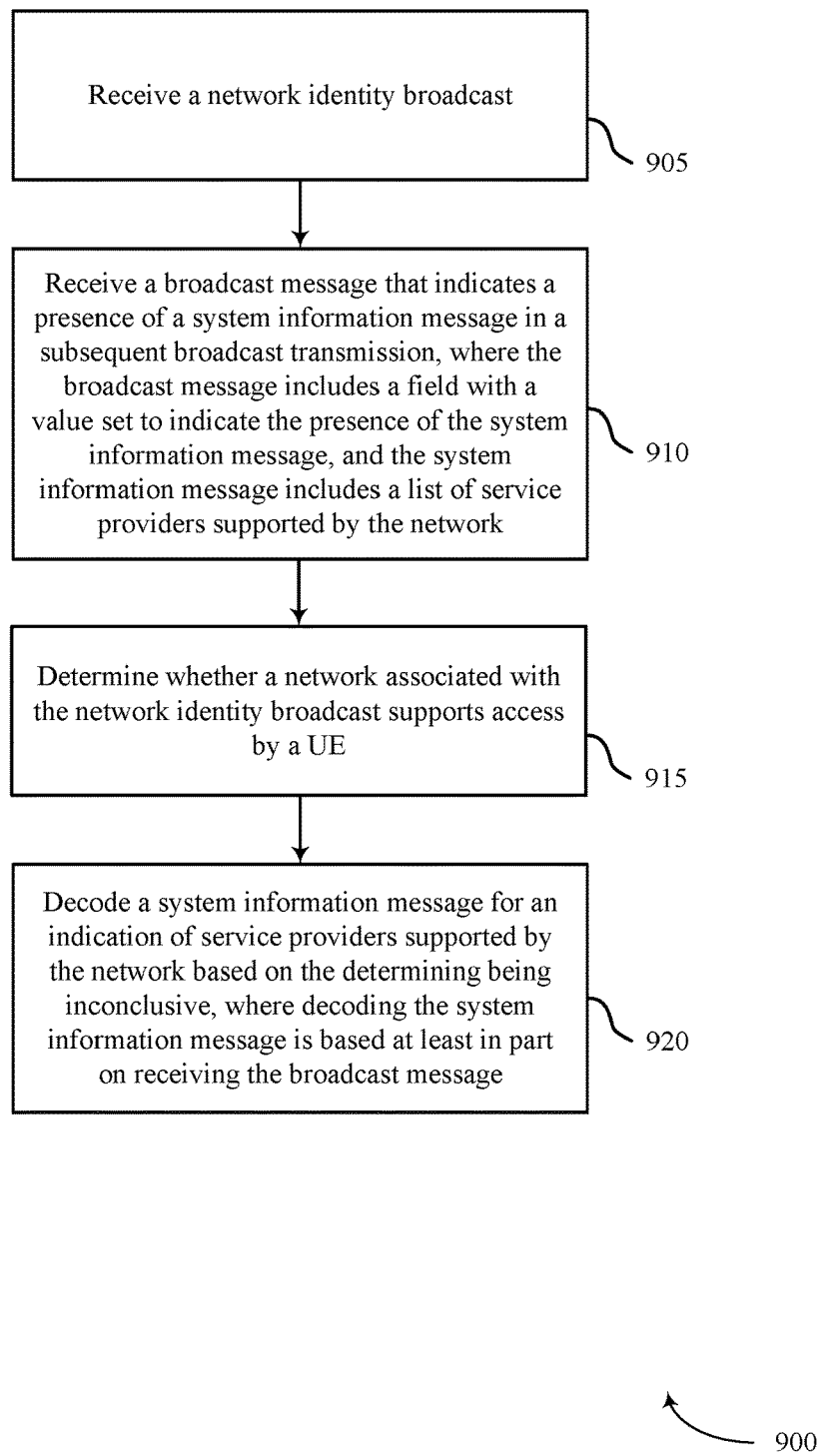

FIG. 9 shows a flowchart illustrating a method 900 for automatic network selection for MuLTEFire in accordance with various aspects of the present disclosure. The operations of method 900 may be implemented by a device such as a UE 115 or its components as described with reference to FIGS. 1 and 2. For example, the operations of method 900 may be performed by the network selection manager as described herein. In some examples, the UE 115 may execute a set of codes to control the functional elements of the device to perform the functions described below. Additionally or alternatively, the UE 115 may perform aspects of the functions described below using special-purpose hardware.

At block 905, the UE 115 may receive a network identity broadcast as described above with reference to FIGS. 2 through 3. In certain examples, the operations of block 905 may be performed by the network identity component as described with reference to FIGS. 5 and 6.

At block 910, the UE 115 may receive a broadcast message that indicates a presence of the system information message in a subsequent broadcast transmission, where the broadcast message may include a field with a value set to indicate the presence of the system information message. In some cases, the system information message may include a list of service providers supported by the network as described above with reference to FIGS. 2 through 3. In certain examples, the operations of block 910 may be performed by the system information component as described with reference to FIGS. 5 and 6.

At block 915, the UE 115 may determine whether a network associated with the network identity broadcast supports access by the UE 115 as described above with reference to FIGS. 2 through 3. In certain examples, the operations of block 915 may be performed by the network support component as described with reference to FIGS. 5 and 6.

At block 920, the UE 115 may decode the system information message for an indication of service providers supported by the network based on the determining being inconclusive, where the decoding the system information message is based on receiving the broadcast message as described above with reference to FIGS. 2 through 3. In certain examples, the operations of block 920 may be performed by the system information component as described with reference to FIGS. 5 and 6.

Figure 10:
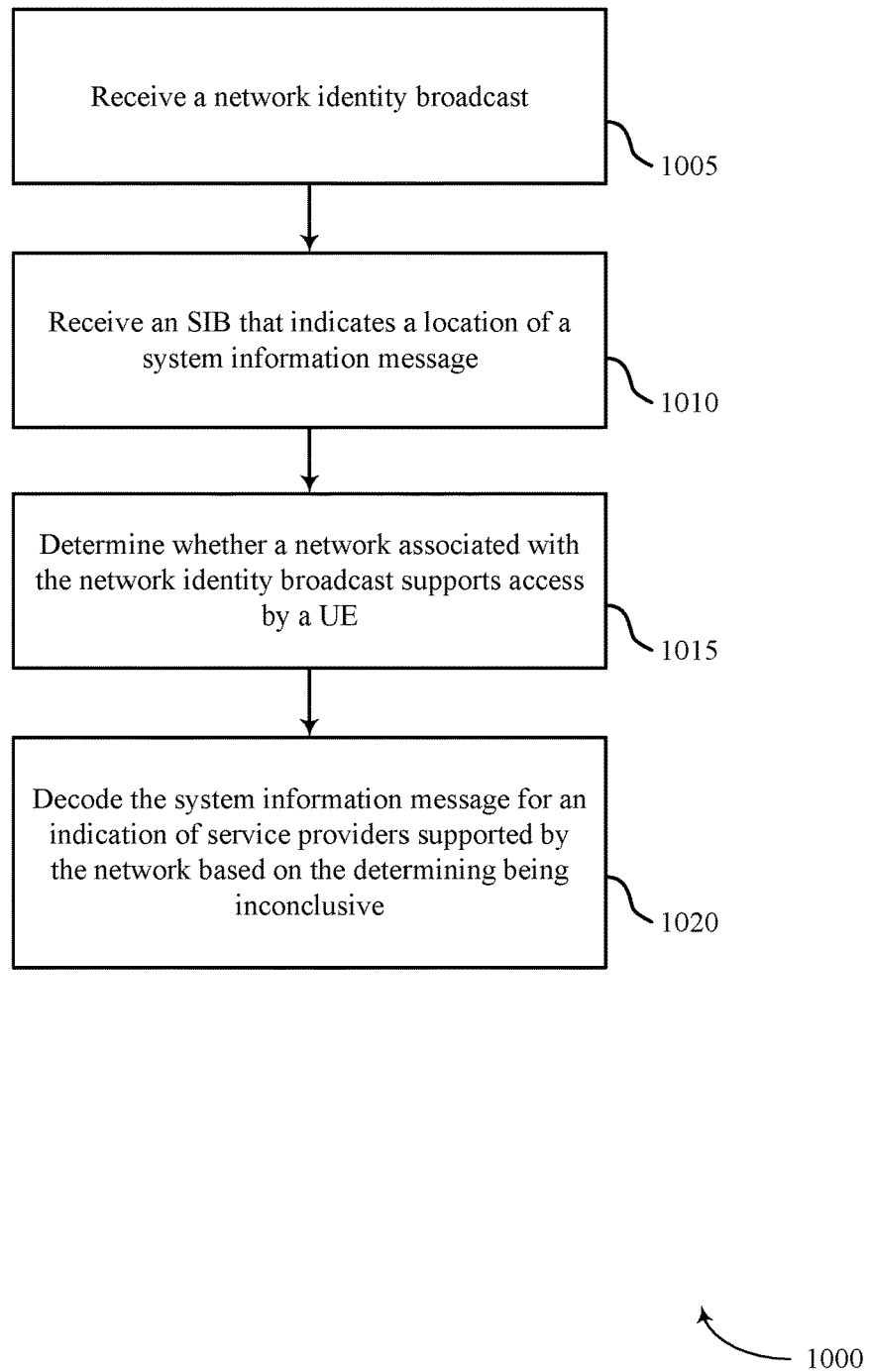

FIG. 10 shows a flowchart illustrating a method 1000 for automatic network selection for MuLTEFire in accordance with various aspects of the present disclosure. The operations of method 1000 may be implemented by a device such as a UE 115 or its components as described with reference to FIGS. 1 and 2. For example, the operations of method 1000 may be performed by the network selection manager as described herein. In some examples, the UE 115 may execute a set of codes to control the functional elements of the device to perform the functions described below. Additionally or alternatively, the UE 115 may perform aspects the functions described below using special-purpose hardware.

At block 1005, the UE 115 may receive a network identity broadcast as described above with reference to FIGS. 2 through 3. In certain examples, the operations of block 1005 may be performed by the network identity component as described with reference to FIGS. 5 and 6.

At block 1010, the UE 115 may receive an SIB that indicates a location of a system information message as described above with reference to FIGS. 2 through 3. In certain examples, the operations of block 1010 may be performed by the system information location component as described with reference to FIGS. 5 and 6.

At block 1015, the UE 115 may determine whether a network associated with the network identity broadcast supports access by the UE 115 as described above with reference to FIGS. 2 through 3. In certain examples, the operations of block 1015 may be performed by the network support component as described with reference to FIGS. 5 and 6.

At block 1020, the UE 115 may decode the system information message for an indication of service providers supported by the network based on the determining being inconclusive as described above with reference to FIGS. 2 through 3. In certain examples, the operations of block 1020 may be performed by the system information component as described with reference to FIGS. 5 and 6.

Figure 11:
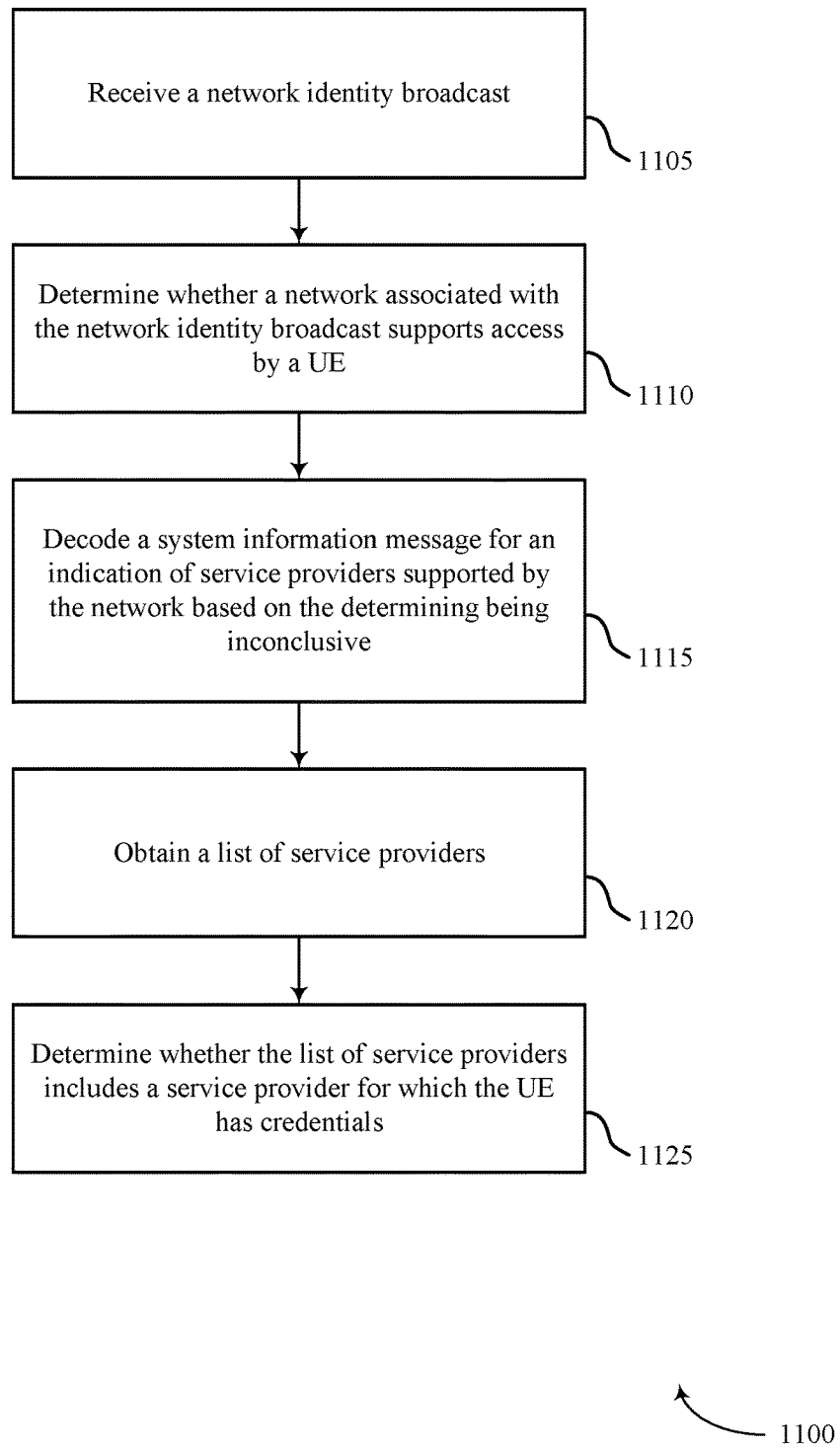

FIG. 11 shows a flowchart illustrating a method 1100 for automatic network selection for MuLTEFire in accordance with various aspects of the present disclosure. The operations of method 1100 may be implemented by a device such as a UE 115 or its components as described with reference to FIGS. 1 and 2. For example, the operations of method 1100 may be performed by the network selection manager as described herein. In some examples, the UE 115 may execute a set of codes to control the functional elements of the device to perform the functions described below. Additionally or alternatively, the UE 115 may perform aspects the functions described below using special-purpose hardware.

At block 1105, the UE 115 may receive a network identity broadcast as described above with reference to FIGS. 2 through 3. In certain examples, the operations of block 1105 may be performed by the network identity component as described with reference to FIGS. 5 and 6.

At block 1110, the UE 115 may determine whether a network associated with the network identity broadcast supports access by the UE 115 as described above with reference to FIGS. 2 through 3. In certain examples, the operations of block 1110 may be performed by the network support component as described with reference to FIGS. 5 and 6.

At block 1115, the UE 115 may decode a system information message for an indication of service providers supported by the network based on the determining being inconclusive as described above with reference to FIGS. 2 through 3. In certain examples, the operations of block 1115 may be performed by the system information component as described with reference to FIGS. 5 and 6.

At block 1120, the UE 115 may decode the system information message to obtain the list of service providers as described above with reference to FIGS. 2 through 3. In certain examples, the operations of block 1120 may be performed by the service provider component as described with reference to FIGS. 5 and 6.

At block 1125, the UE 115 may determine whether the list of service providers includes a service provider for which the UE 115 has credentials as described above with reference to FIGS. 2 through 3. In certain examples, the operations of block 1125 may be performed by the service provider credential component as described with reference to FIGS. 5 and 6.

Figure 12:
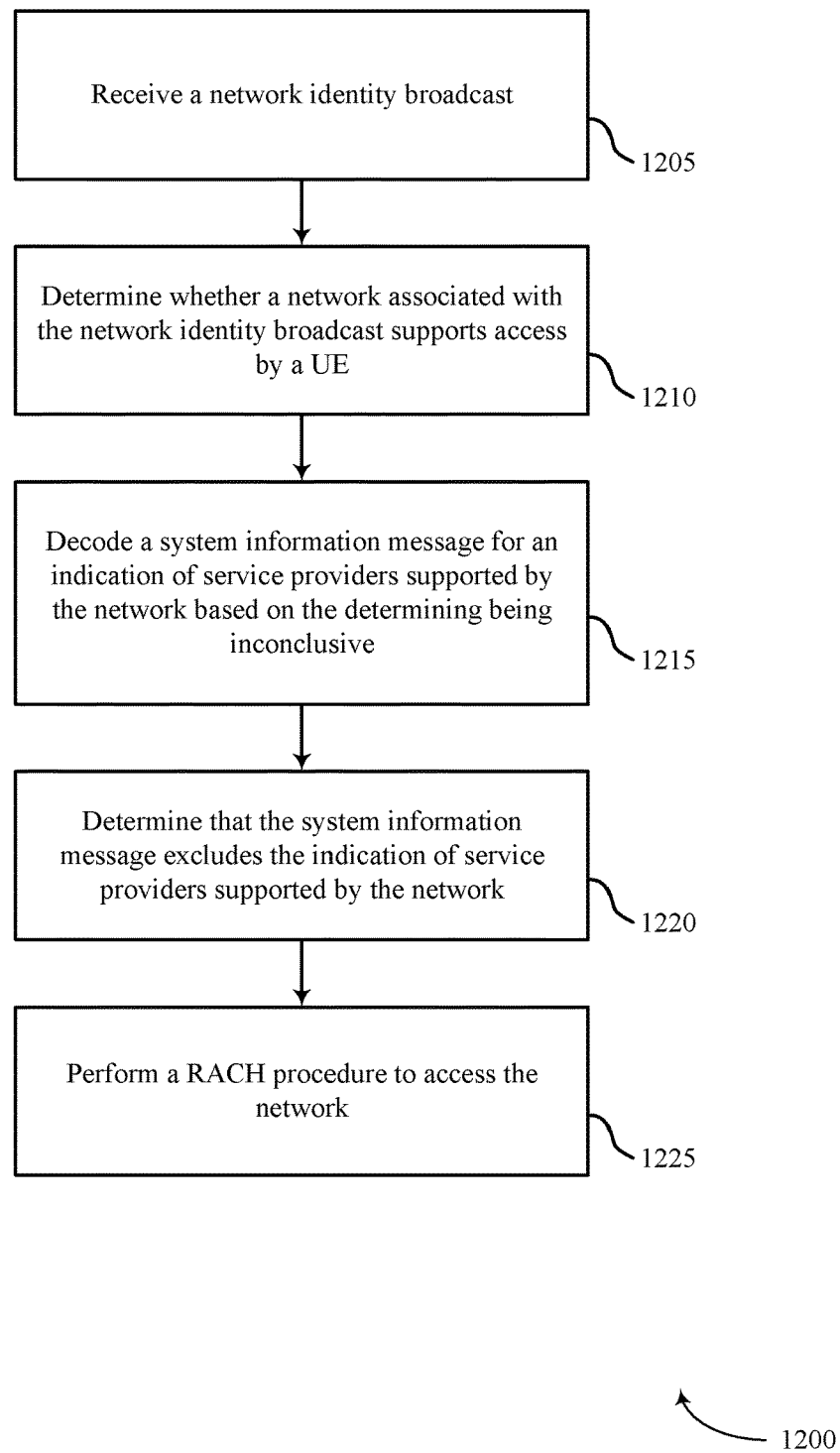

FIG. 12 shows a flowchart illustrating a method 1200 for automatic network selection for MuLTEFire in accordance with various aspects of the present disclosure. The operations of method 1200 may be implemented by a device such as a UE 115 or its components as described with reference to FIGS. 1 and 2. For example, the operations of method 1200 may be performed by the network selection manager as described herein. In some examples, the UE 115 may execute a set of codes to control the functional elements of the device to perform the functions described below. Additionally or alternatively, the UE 115 may perform aspects the functions described below using special-purpose hardware.

At block 1205, the UE 115 may receive a network identity broadcast as described above with reference to FIGS. 2 through 3. In certain examples, the operations of block 1205 may be performed by the network identity component as described with reference to FIGS. 5 and 6.

At block 1210, the UE 115 may determine whether a network associated with the network identity broadcast supports access by the UE 115 as described above with reference to FIGS. 2 through 3. In certain examples, the operations of block 1210 may be performed by the network support component as described with reference to FIGS. 5 and 6.

At block 1215, the UE 115 may decode a system information message for an indication of service providers supported by the network based on the determining being inconclusive as described above with reference to FIGS. 2 through 3. In certain examples, the operations of block 1215 may be performed by the system information component as described with reference to FIGS. 5 and 6.

At block 1220, the UE 115 may determine that the system information message excludes the indication of service providers supported by the network as described above with reference to FIGS. 2 through 3. In certain examples, the operations of block 1220 may be performed by the service provider component as described with reference to FIGS. 5 and 6.

At block 1225, the UE 115 may perform a RACH procedure to access the network as described above with reference to FIGS. 2 through 3. In certain examples, the operations of block 1225 may be performed by the RACH component as described with reference to FIGS. 5 and 6.

Figure 13:
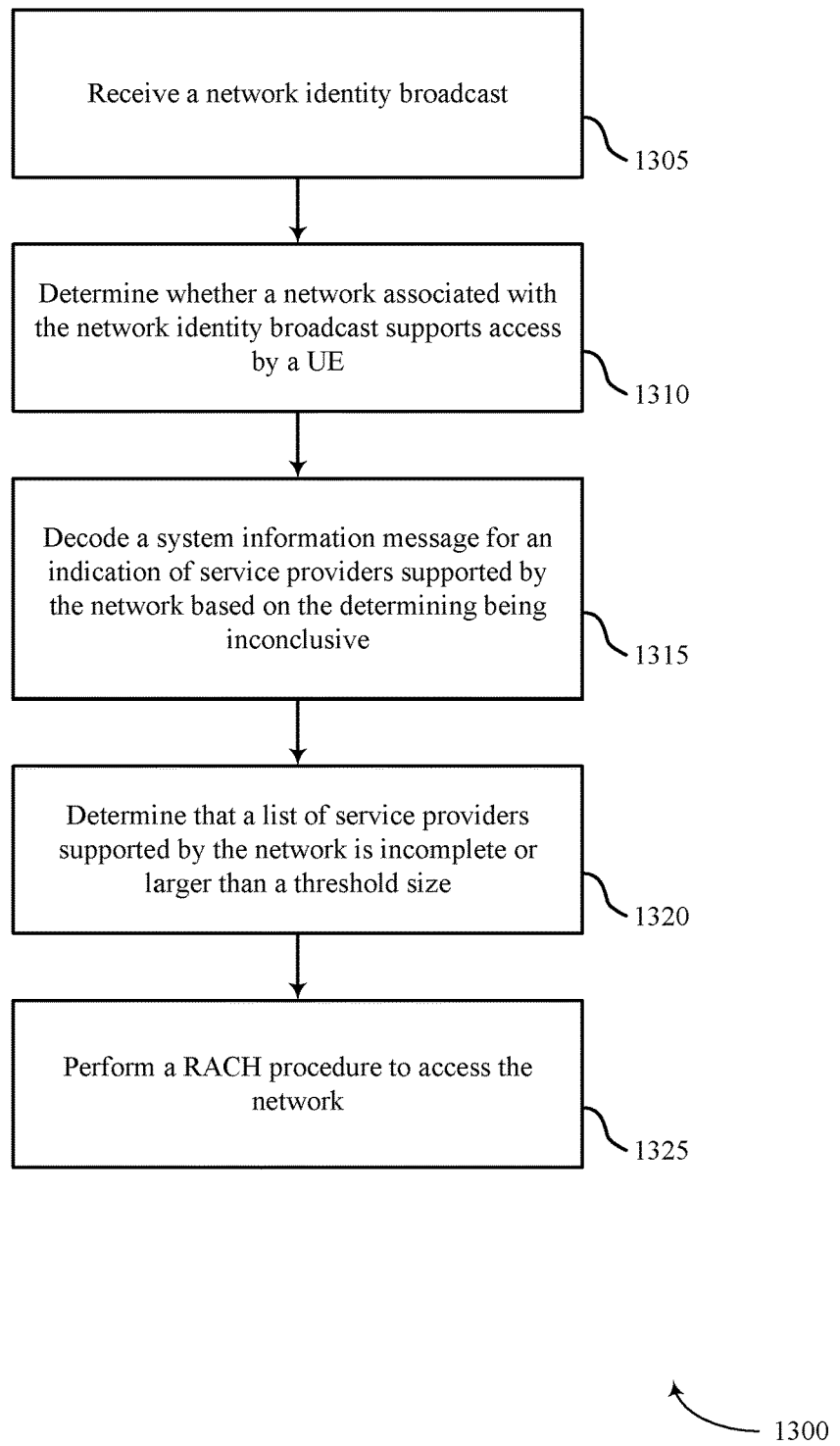

FIG. 13 shows a flowchart illustrating a method 1300 for automatic network selection for MuLTEFire in accordance with various aspects of the present disclosure. The operations of method 1300 may be implemented by a device such as a UE 115 or its components as described with reference to FIGS. 1 and 2. For example, the operations of method 1300 may be performed by the network selection manager as described herein. In some examples, the UE 115 may execute a set of codes to control the functional elements of the device to perform the functions described below. Additionally or alternatively, the UE 115 may perform aspects the functions described below using special-purpose hardware.

At block 1305, the UE 115 may receive a network identity broadcast as described above with reference to FIGS. 2 through 3. In certain examples, the operations of block 1305 may be performed by the network identity component as described with reference to FIGS. 5 and 6.

At block 1310, the UE 115 may determine whether a network associated with the network identity broadcast supports access by the UE 115 as described above with reference to FIGS. 2 through 3. In certain examples, the operations of block 1310 may be performed by the network support component as described with reference to FIGS. 5 and 6.

At block 1315, the UE 115 may decode a system information message for an indication of service providers supported by the network based on the determining being inconclusive as described above with reference to FIGS. 2 through 3. In certain examples, the operations of block 1315 may be performed by the system information component as described with reference to FIGS. 5 and 6.

At block 1320, the UE 115 may determine that a list of service providers supported by the network is incomplete or larger than a threshold size as described above with reference to FIGS. 2 through 3. In certain examples, the operations of block 1320 may be performed by the service provider component as described with reference to FIGS. 5 and 6.

At block 1325, the UE 115 may perform a RACH procedure to access the network as described above with reference to FIGS. 2 through 3. In certain examples, the operations of block 1325 may be performed by the RACH component as described with reference to FIGS. 5 and 6.

It should be noted that the methods 800, 900, 1000, 1100, 1200, and 1300 describe possible implementation, and that the operations and the steps may be rearranged or otherwise modified such that other implementations are possible. In some examples, aspects from two or more of the methods 800, 900, 1000, 1100, 1200, and 1300 described with reference to FIGS. 8, 9, 10, 11, 12, and 13 may be combined. For example, aspects from two or more of the methods 800, 900, 1000, 1100, 1200, and 1300 may include steps or aspects of the other methods, or other steps or techniques described herein. Thus, aspects of the disclosure may provide for automatic network selection for MuLTEFire.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for automatic network selection for MuLTEFire. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication comprising:
   receiving a network identity broadcast;
   determining whether a network associated with the network identity broadcast supports access by a user equipment (UE);
   receiving a master information block (MIB) that comprises an indicator of a presence of a system information message;
   decoding the system information message indicated by the MIB for an indication of service providers supported by the network based at least in part on the determining being inconclusive;
   determining that the system information message excludes the indication of service providers supported by the network; and
   performing a random access channel (RACH) procedure to access the network based at least in part on determining that the system information message excludes the indication of service providers supported by the network.

2. The method of claim 1, wherein the system information message is received in a broadcast transmission subsequent to the network identity broadcast, wherein the decoding the system information message is based at least in part on receiving the broadcast message.

3. The method of claim 2, wherein the system information message includes a list of service providers supported by the network.

4. The method of claim 1, further comprising:
   receiving a system information block (SIB) that indicates a location of the system information message.

5. The method of claim 4, wherein the SIB is SIB2 or an enhanced SIB (eSIB).

6. The method of claim 4, wherein the SIB indicates whether a list of service providers comprises a comprehensive list of service providers supported by the network.

7. The method of claim 4, wherein the SIB indicates a number of service providers included in a list of service providers supported by the network.

8. The method of claim 1, further comprising:
decoding the system information message to obtain a list of service providers; and
determining whether the list of service providers includes a service provider for which the UE has credentials.

9. The method of claim 8, further comprising:
determining that the list of service providers includes the service provider for which the UE has credentials; and
communicating with the network using the credentials of the service provider, wherein using the credentials comprises attaching to a mobility management entity (MME) of the network.

10. The method of claim 8, wherein the list of service providers includes a plurality of service providers for which the UE has credentials.

11. The method of claim 8, further comprising:
determining that the list of service providers excludes the service provider for which the UE has credentials; and
communicating with the network using a non-access stratum procedure.

12. The method of claim 11, wherein the communicating comprises at least one of transmitting an indication of service providers for which the UE has credentials, transmitting a request for the list of service providers supported by the network, or receiving at least a partial list of service providers supported by the network.

13. The method of claim 8, wherein the decoding the system information message comprises:
blindly decoding the system information message.

14. The method of claim 1, further comprising:
transmitting an indication of whether the UE determined that it was authorized to access the network based on the received network identity broadcast, or transmitting an indication of whether the UE identified a service provider for which the UE has credentials in another system information message.

15. The method of claim 1, further comprising:
communicating with the network using a non-access stratum procedure based at least in part on performing the RACH procedure.

16. The method of claim 1, further comprising:
determining that a list of service providers supported by the network is incomplete or larger than a threshold size; and
performing the RACH procedure to access the network based at least in part on determining that the list of service providers supported by the network is incomplete or larger than the threshold size.

17. The method of claim 1, further comprising:
transmitting a request for the system information message to be broadcast by the network.

18. The method of claim 17, wherein the request is transmitted in a random access channel (RACH) message.

19. An apparatus for wireless communication comprising:
a receiver configured to receive a network identity broadcast and configured to receive a master information block (MIB) that comprises an indicator of a presence of a system information message;
means for determining whether a network associated with the network identity broadcast supports access by a user equipment (UE);
means for decoding the system information message indicated by the MIB for an indication of service providers supported by the network based at least in part on the determining being inconclusive;
means for determining that the system information message excludes the indication of service providers supported by the network; and
means for performing a random access channel (RACH) procedure to access the network based at least in part on determining that the system information message excludes the indication of service providers supported by the network.

20. The apparatus of claim 19, further comprising:
means for transmitting an indication of whether the UE determined that it was authorized to access the network based on the received network identity broadcast; or
means for transmitting an indication of whether the UE identified a service provider for which the UE has credentials in another system information message; or
a combination thereof.

21. The apparatus of claim 19, further comprising:
means for communicating with the network using a non-access stratum procedure based at least in part on performing the RACH procedure.

22. An apparatus for wireless communication, comprising:
a processor;
memory in electronic communication with the processor; and
instructions stored in the memory and operable, when executed by the processor, to cause the apparatus to:
receive a network identity broadcast;
determine whether a network associated with the network identity broadcast supports access by a user equipment (UE);
receive a master information block (MIB) that comprises an indicator of a presence of a system information message;
decode the system information message indicated by the MIB for an indication of service providers supported by the network based at least in part on the determining being inconclusive;
determine that the system information message excludes the indication of service providers supported by the network; and
perform a random access channel (RACH) procedure to access the network based at least in part on determining that the system information message excludes the indication of service providers supported by the network.

23. The apparatus of claim 22, wherein the system information message is received in a broadcast transmission subsequent to the network identity broadcast, wherein the decoding the system information message is based at least in part on receiving the broadcast message.

24. The apparatus of claim 23, wherein the system information message includes a list of service providers supported by the network.

25. The apparatus of claim 22, wherein the instructions are executable by the processor to cause the apparatus to:
receive a system information block (SIB) that indicates a location of the system information message.

26. The apparatus of claim 22, wherein the instructions are executable by the processor to cause the apparatus to:

decode the system information message to obtain a list of service providers; and
determine whether the list of service providers includes a service provider for which the UE has credentials.

27. The apparatus of claim 22, wherein the instructions are executable by the processor to cause the apparatus to:
transmit an indication of whether the UE determined that it was authorized to access the network based on the received network identity broadcast; or
transmit an indication of whether the UE identified a service provider for which the UE has credentials in another system information message; or
a combination thereof.

28. The apparatus of claim 22, wherein the instructions are executable by the processor to cause the apparatus to:
communicate with the network using a non-access stratum procedure based at least in part on performing the RACH procedure.

29. A non-transitory computer-readable medium storing code for wireless communication, the code comprising instructions executable to:
receive a network identity broadcast;
determine whether a network associated with the network identity broadcast supports access by a user equipment (UE);
receive a master information block (MIB) that comprises an indicator of a presence of a system information message;
decode the system information message indicated by the MIB for an indication of service providers supported by the network based at least in part on the determining being inconclusive;
determine that the system information message excludes the indication of service providers supported by the network; and
perform a random access channel (RACH) procedure to access the network based at least in part on determining that the system information message excludes the indication of service providers supported by the network.

30. The non-transitory computer-readable medium of claim 29, wherein the instructions are executable to:
transmit an indication of whether the UE determined that it was authorized to access the network based on the received network identity broadcast; or
transmit an indication of whether the UE identified a service provider for which the UE has credentials in another system information message; or
a combination thereof.

* * * * *